(12) United States Patent
Ming-Fu (10) Patent No.: US 6,485,039 B1
(45) Date of Patent: Nov. 26, 2002

(54) SWINGABLE SKATE BOARD DEVICE

(76) Inventor: Kuo Ming-Fu, No. 15-60, Lane 139, Hoping Rd., Tachia, Taichung (TW)

( * ) Notice: Subject to any disclaimer, the term of this patent is extended or adjusted under 35 U.S.C. 154(b) by 0 days.

(21) Appl. No.: 09/696,287

(22) Filed: Oct. 26, 2000

(51) Int. Cl.[7] .................................................. B62M 1/00
(52) U.S. Cl. ................................. 280/87.041; 280/282
(58) Field of Search ........................ 280/87.021, 87.041, 280/87.042, 87.01, 282, 639, 62; 16/332, 334; 403/321, 322.2, 324; 248/407, 408

(56) References Cited

U.S. PATENT DOCUMENTS

| | | | | |
|---|---|---|---|---|
| 4,065,146 A | * | 12/1977 | Denzer | 280/278 |
| 4,088,338 A | * | 5/1978 | Winchell et al. | 280/220 |
| 4,114,235 A | * | 9/1978 | Remington | 16/139 |
| 4,540,192 A | * | 9/1985 | Shelton | 280/282 |
| 4,799,702 A | * | 1/1989 | Wang | 280/87.041 |
| 4,805,737 A | * | 2/1989 | Peng | 182/163 |
| 5,039,121 A | * | 8/1991 | Holter | 280/220 |
| 5,388,659 A | * | 2/1995 | Pepe | 180/219 |
| 5,511,444 A | * | 4/1996 | Clausen et al. | 74/551.2 |
| 5,785,331 A | * | 7/1998 | Rappaport | 280/87.041 |
| 5,954,349 A | * | 9/1999 | Rutzel | 280/87.041 |

FOREIGN PATENT DOCUMENTS

| | | | | |
|---|---|---|---|---|
| JP | 05085451 A | * | 4/1993 | 280/FOR 133 |
| JP | 06135368 A | * | 5/1994 | 280/252 |

* cited by examiner

Primary Examiner—Brian L. Johnson
Assistant Examiner—Kelly E Campbell
(74) Attorney, Agent, or Firm—Bacon & Thomas, PLLC

(57) ABSTRACT

A swingable skate board device. The device includes handles, a handle supporting rod, two pedal plates, a front wheel, a supporting rod, and two rear wheels. The handles are horizontally extending from the handle supporting rod. The handle supporting rod is fixed with the supporting rod. The front wheel is pivotally connected at an end of the supporting rod. Two frame rods of two pedal plates are pivotally disposed on the supporting rod. Two rear wheels are disposed on the pedal plates. One frame rod has a curved recess and the other frame rod has a protrusion engaging with the curved recess for limiting a swinging angle between these two pedal plates.

3 Claims, 7 Drawing Sheets

SWINGABLE SKATE BOARD DEVICE

BACKGROUND OF INVENTION

1. Field of the Invention

The present invention is related to a skate board device, especially to a swingable skate board device with a limited swinging angle. In which, its open and close swinging movements can be totally controlled by the user's mind with good stability and excellent safety.

2. Description of the Prior Art

The outdoor exercises are quite popular in nowadays society. Many devices related to exercising or recreational activities were invented. The skate board device is very popular for most people in these years, especially for the youth. The earlier skate board is designed as a single pedal plate type. Now, the most fashionable skate board device is the swingable two pedal plate type. The major attraction includes its technical requirement for driving it and its feeling of high speed during skating. However, safety still is the most important factor that a designer will consider to. For the conventional swingable skate board device, many youths are hurt during skating. One reason is that the handling skill is not good. The other reason is that the design of the swingable skate board device is improper.

Figure 3:
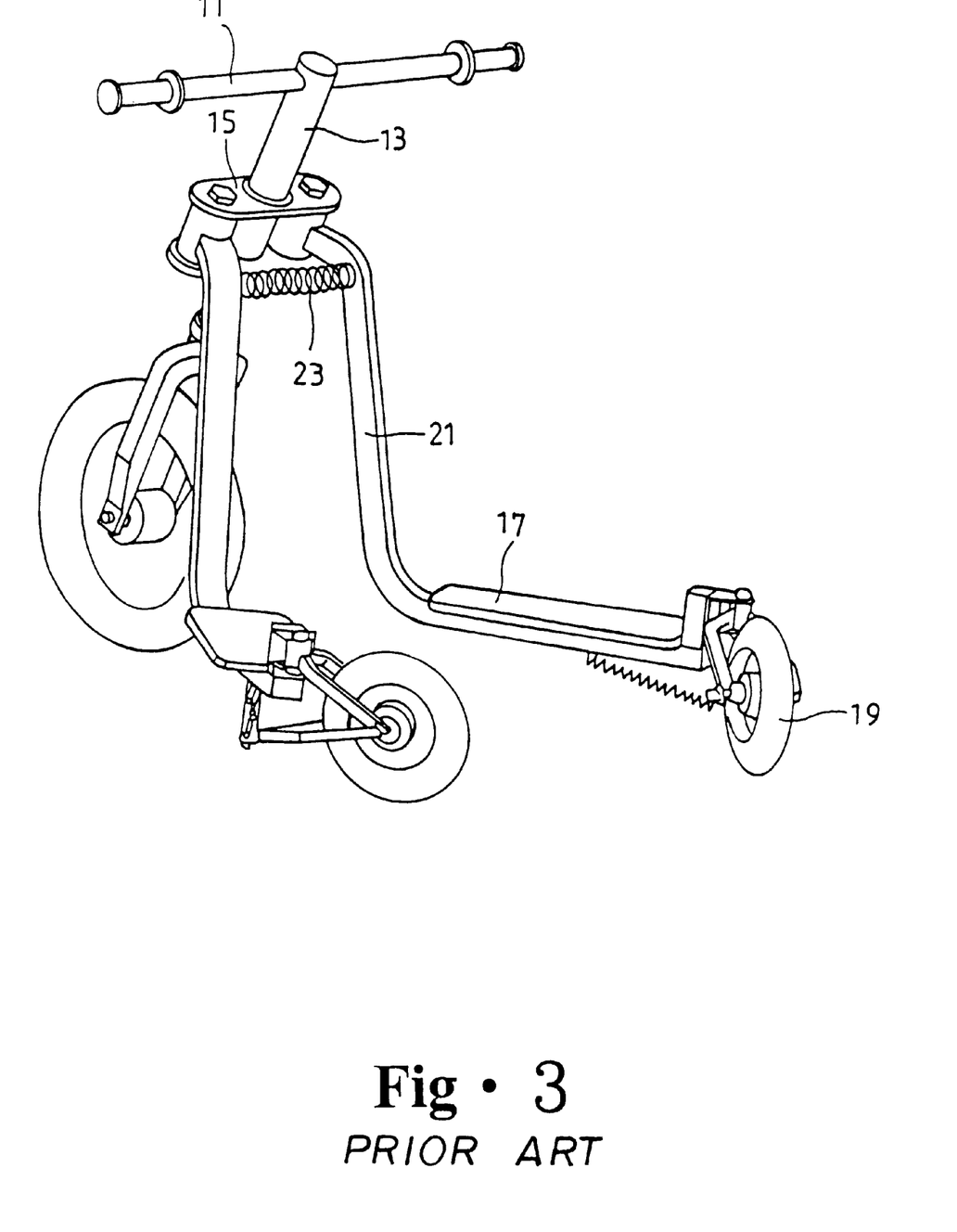
FIG. 3 is a perspective view of the conventional swingable skate board device.

As shown in FIG. 3, the conventional swingable skate board device mainly comprises two handles 11, a handle supporting rod 13, a turning section 15, two pedal plates 17 and two rear wheels 19.

The handles 11 are horizontally extended from a top end of the handle supporting rod 13. The turning section 15 is fixed on the handle supporting rod 13. By means of ball bearings (not shown) and fastening elements (not shown), two frame rods 21 of the pedal plates 17 can be simultaneously rotated with the turning section 17. A spring 23 is set between these two frame rods 21. So, when these two pedal plates 17 swing outward, this spring 17 will draw them back. Thus, repeated open and close swinging movements can be created. That is, the user can drive this conventional swingable skate board device moving. Although this convention device can achieve the purpose of recreational exercise, it still has the following disadvantages.

1. The open/close swinging movements are created by the frame rod 21, the turning section 15, and the spring 23. Such open/close movements are repeated and continuous. Because the spring 23 will compulsively draw these two pedal plates 17 inward, it is hard to maintain these pedal plates 17 in an open state. In case the user wants to bypass a hole or a block on the road, it is very difficult for the user to maintain such open state. Thus, without such bypassing the hole or the block, the user might be dropped or injured.

2. The open/close swinging movements are created by the frame rod 21, the turning section 15, and the spring 23. It can achieve the purpose of moving forward. But, except the spring 23, there is no any element for limiting the swinging angle between these two frame rods 21. If the spring 23 is failed due to mechanical fatigue, these two pedal plates 17 might open to an uncontrollable state. This will lead to another dangerous condition for the user.

SUMMARY OF THE INVENTION

The primary object of the present invention is to provide a swingable skate board device with a limited swinging angle. It can be totally controlled by the user's mind with good stability and excellent safety.

The second object of the present invention is to provide a swingable skate board device with a limited swinging angle. Under a simple operation, the user can use his/her feet to easily control the open/close swinging movements of the pedal plates. Thus, it is more technical and more challenging for a professional skater or user.

DETAILED DESCRIPTION OF THE PREFERRED EMBODIMENT

Figure 4:
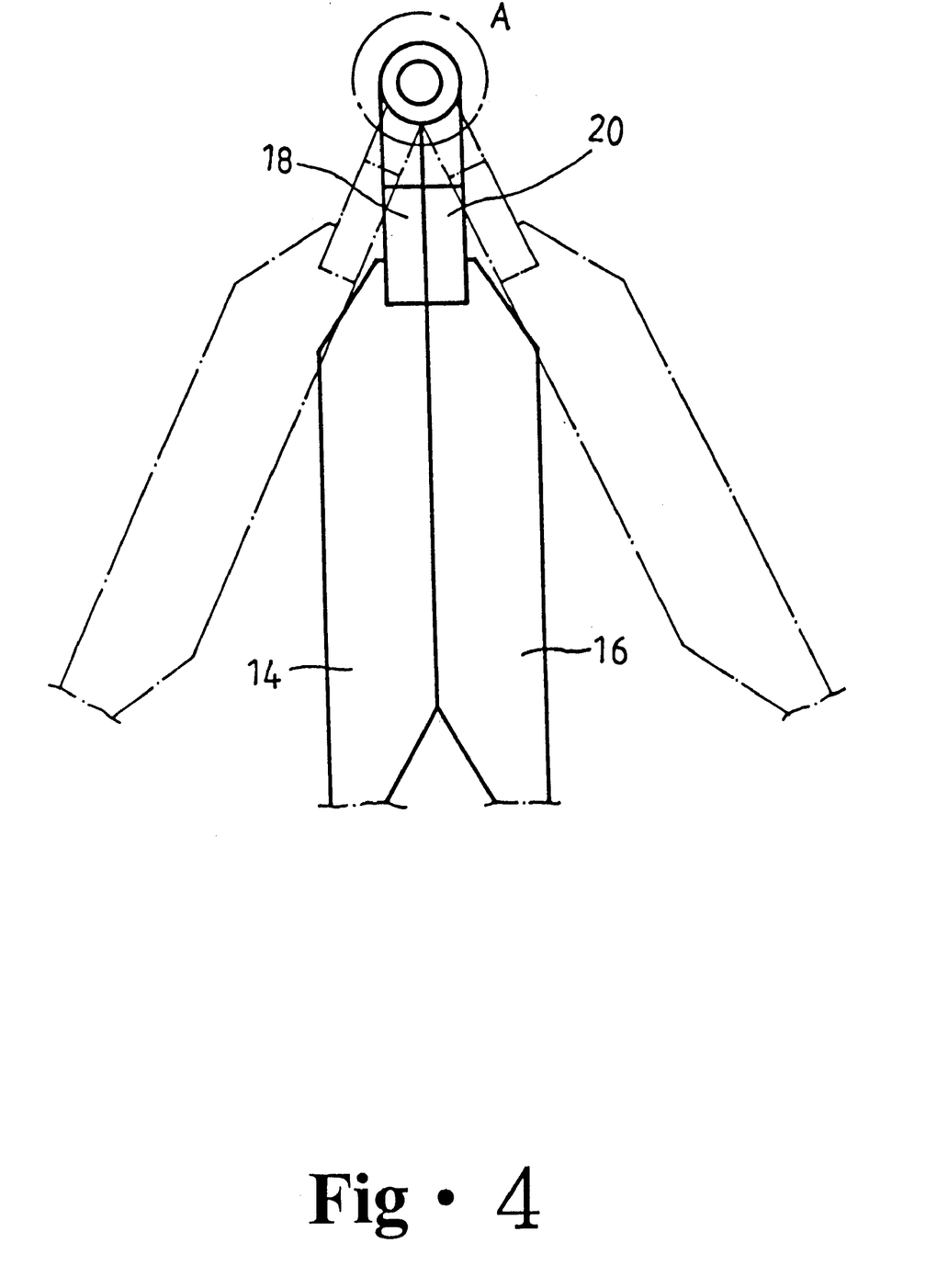
FIG. 4 shows the operating condition of the present invention.
Figure 5:
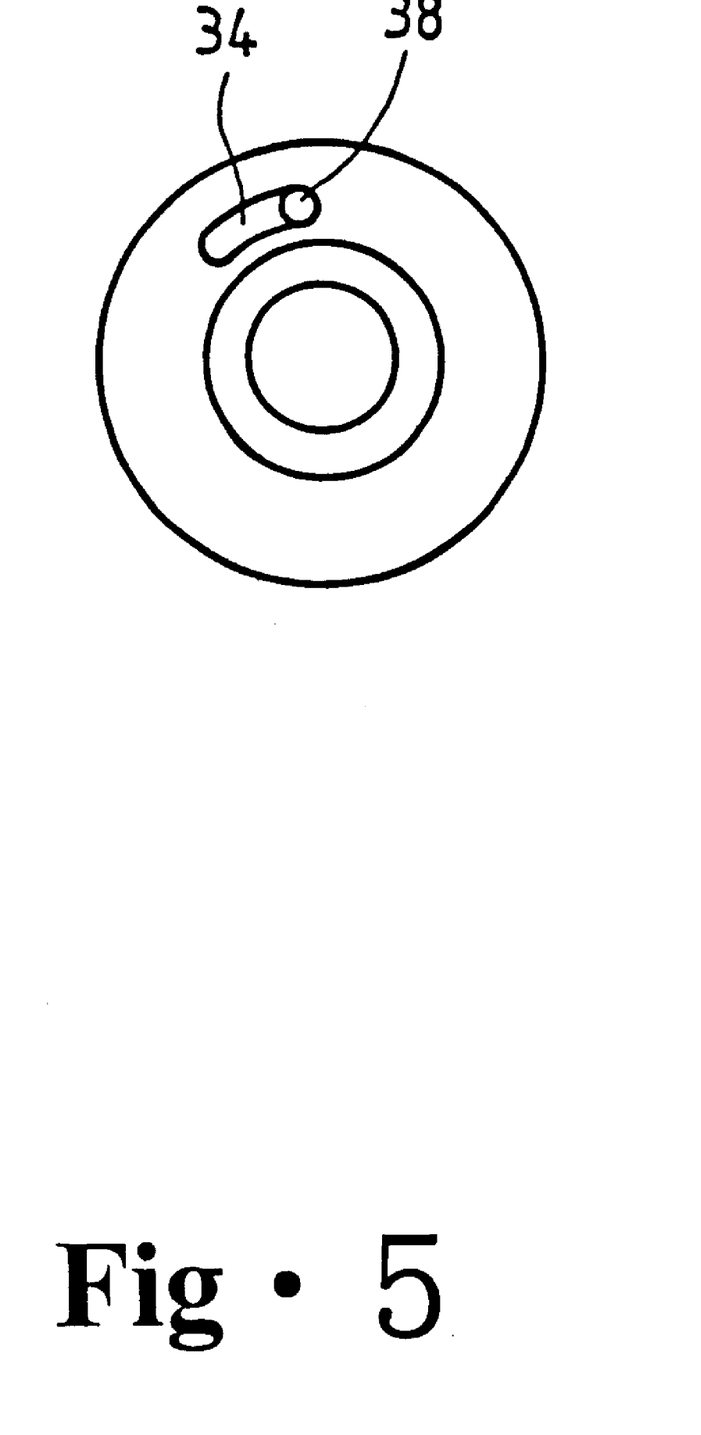
FIG. 5 is a top view at the selected portion A in FIG. 4.

Referring to FIGS. 1, 2 and 4–7, the present invention is a swingable skating board. Its structure comprises:

Two pedal plates 14, 16 have two front ends. These two front ends extend out two frame rods 18, 20 respectively. These two frame rods 18, 20 are engaged at one end as shown in FIGS. 4 and 5. One frame rod 18 has a curved recess 34. The other frame rod 20 has a screw hole 36 with a screw 38 for engaging with the curved recess 34 so as to limit a swinging angle between these two pedal tables 14, 16.

Figure 6:
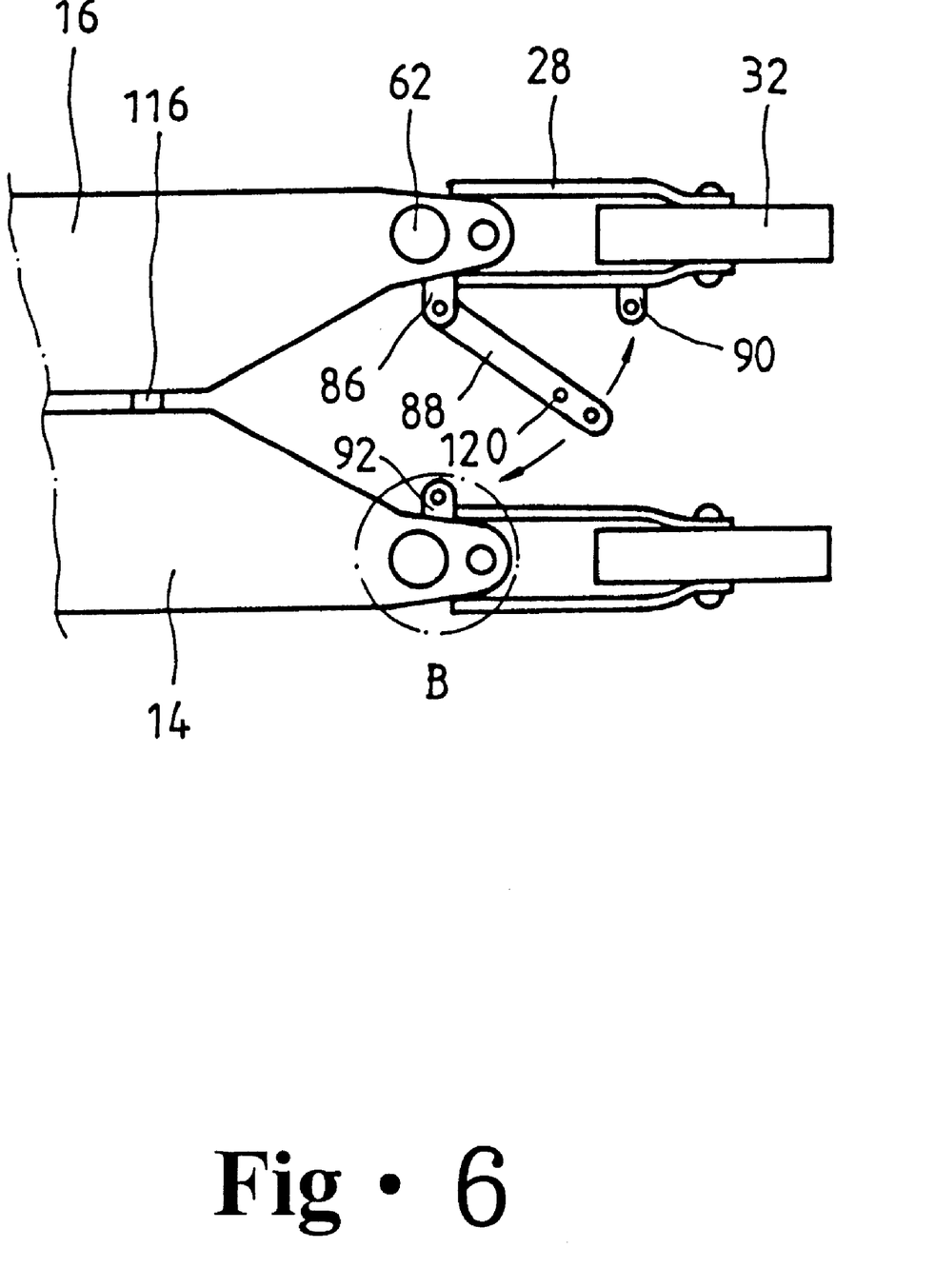
FIG. 6 illustrates the single pedal skate board device mode of the present invention.
Figure 7:
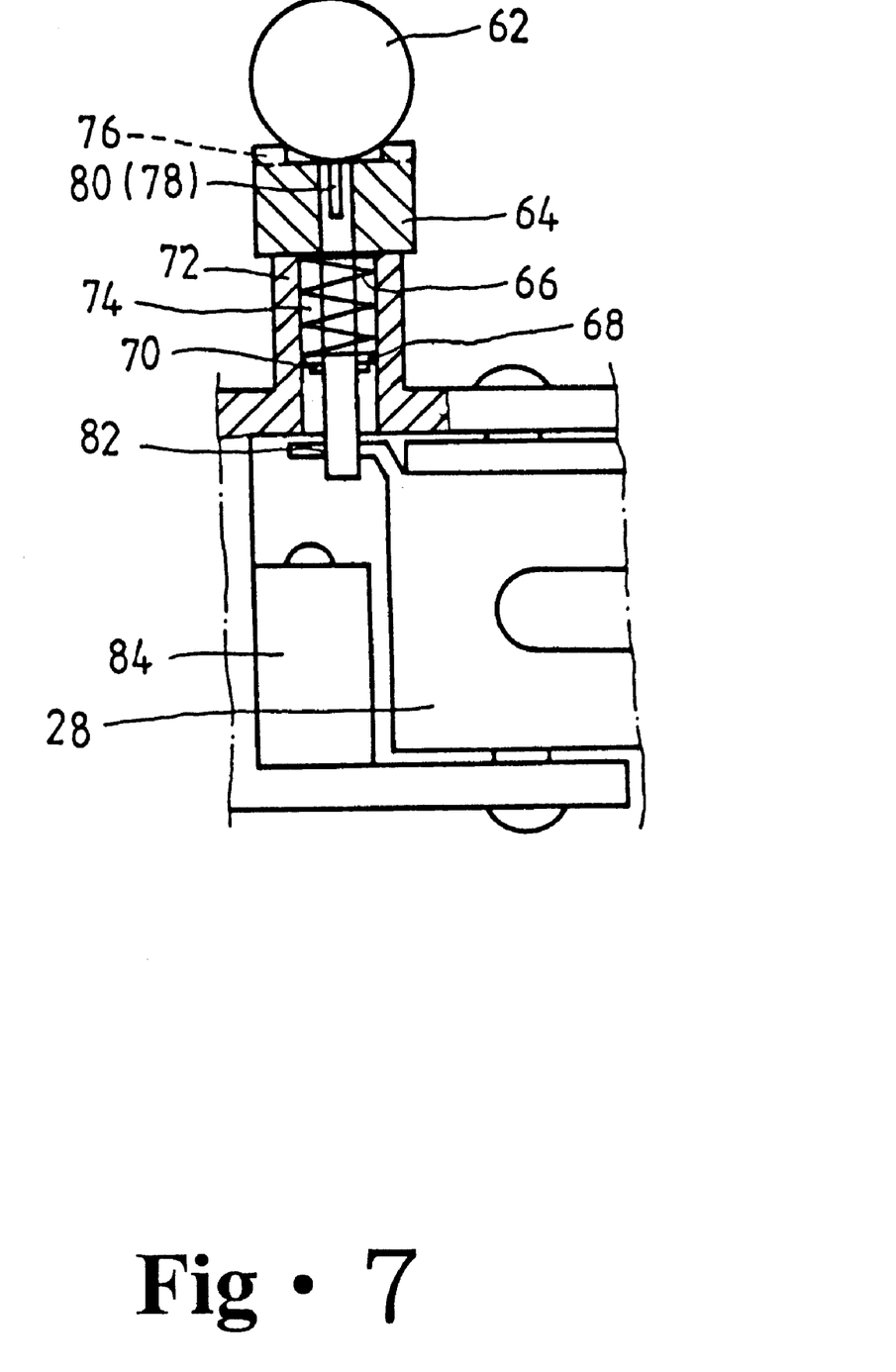
FIG. 7 is a cross-sectional view at the selected portion B in FIG. 6.

Two pedal plates 14, 16 have two rear ends. These two rear ends are disposed with two auxiliary frames 28 respectively. Each auxiliary frame 28 has a slotted end for inserting a rear wheel 32. As shown in FIGS. 6 and 7, a protruded seat 72 has a through hole 74 that is disposed on a rear end of each pedal plate 14,16. A securing cap 64 is fixed with the protruded seat 72. A positioning latch 62 passes through the securing cap 64, a rear spring 66 and a rear washer 68 and is locked by a C-shaped hook 70. So, when the positioning latch 62 is pulled up, two protruded locking plates 80 of the positioning latch 62 are secured in a transverse slot 76 of the securing cap 64, so as to allow the auxiliary frame 28 to be swingable. A rubber block 84 can control and buffer the swinging angle of the auxiliary frame 28. The free end of a link 88 is locked on a second locking flange 90 by a bolt 94. In addition, when the positioning latch 62 is released, these two protruded locking plates 80 that pass through a central slot 78 of the securing cap 64 will make the positioning rod 62 pass through an auxiliary hole 82 of the auxiliary frame 28. Thus, the auxiliary frame 28 becomes fixed. Alternatively, after rotating the link 88 which is pivoted on a first locking flange 86, the link 88 can be locked on an opposite third locking flange 92. Therefore, these two pedal plates 14,16 are tightly fixed together as a single pedal plate mode.

Figure 1:
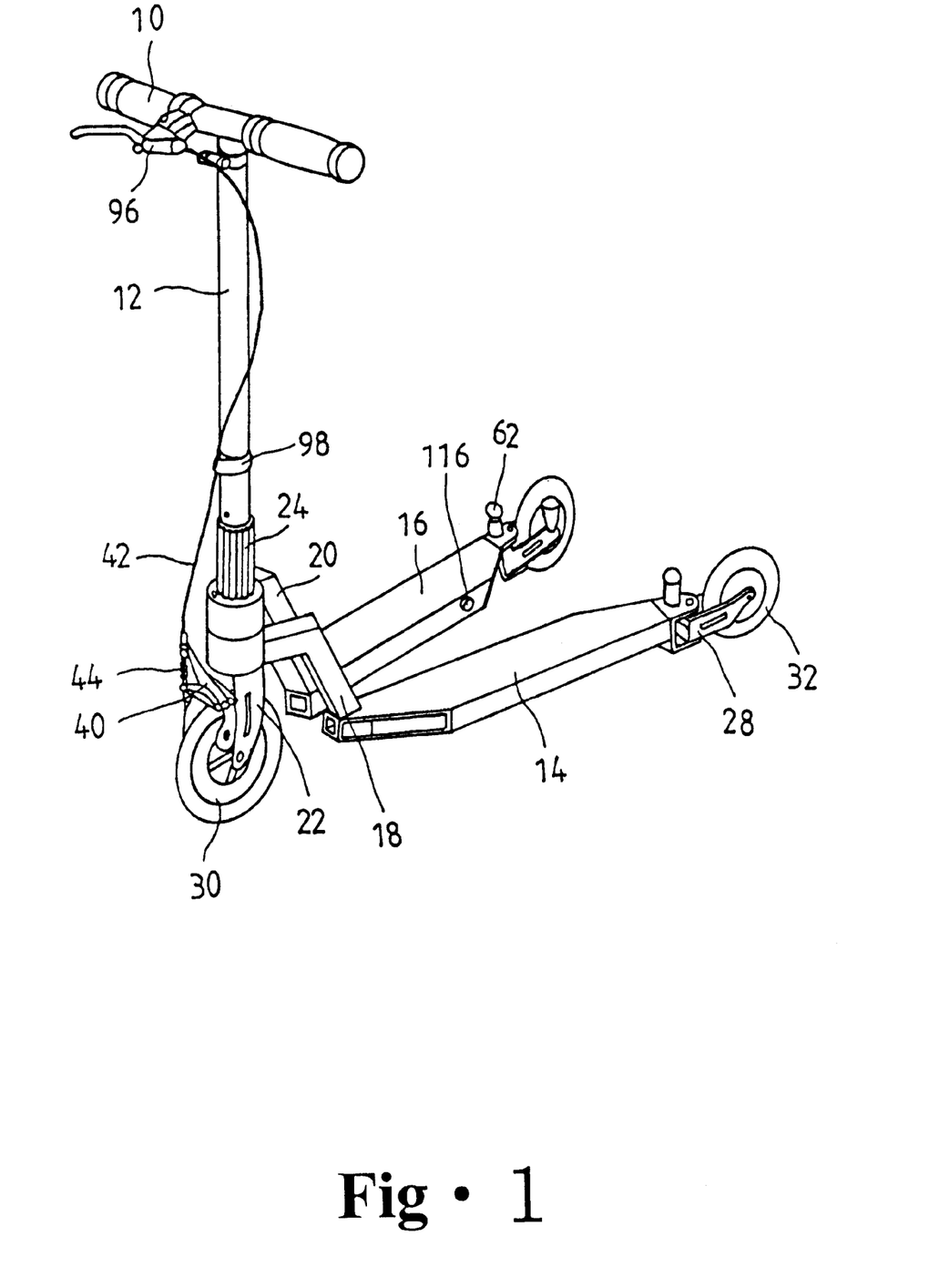
FIG. 1 is an assembled perspective view of the present invention.
Figure 2:
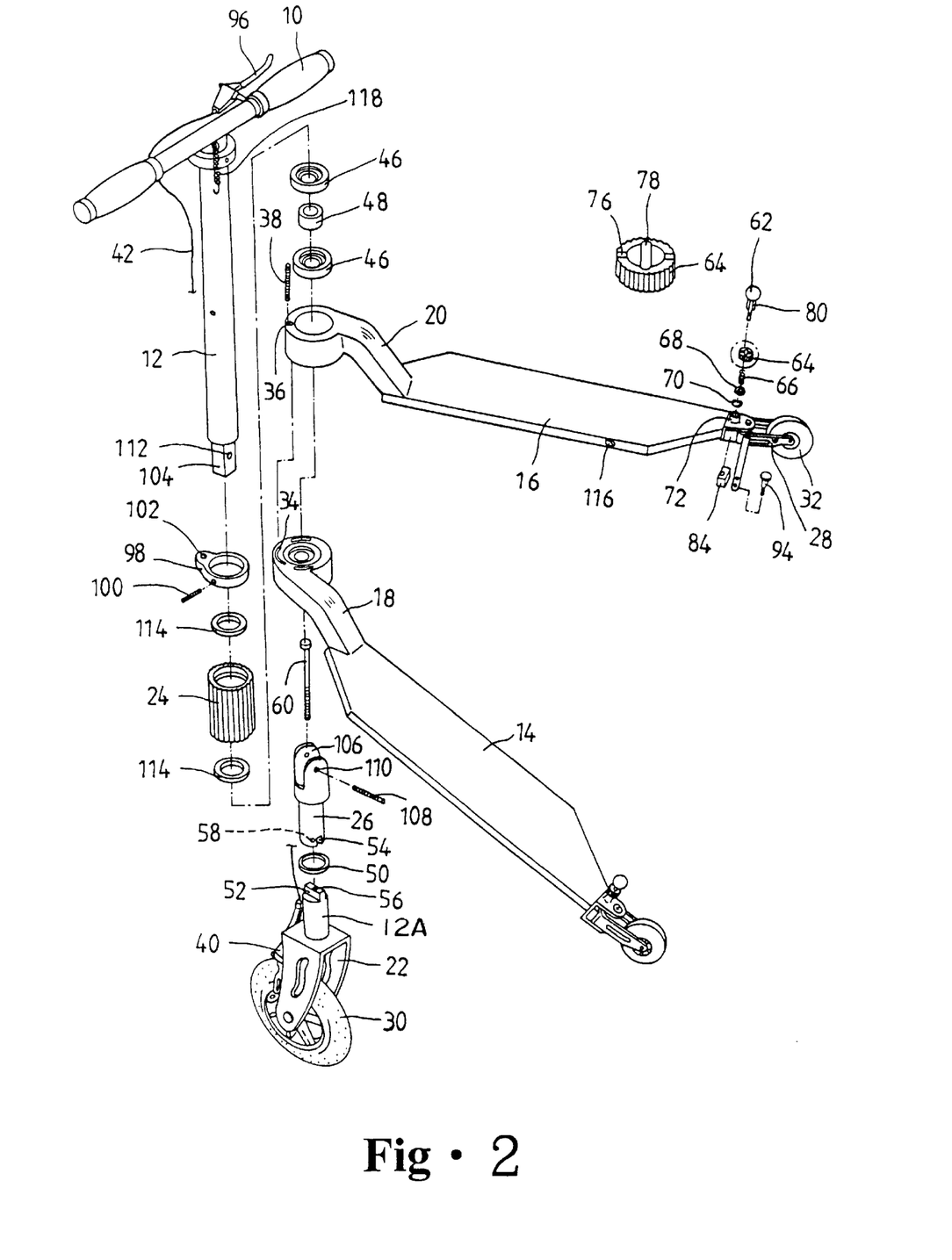
FIG. 2 is a disassembled perspective view of the present invention.

A handle rod 12 has a bottom end. The bottom end of the supporting rod 12, via a wheel supporting rod 12A, is disposed with a supporting frame 22. A front wheel 30 is pivotally connected at an inserting end of the wheel supporting rod 12A. A brake 40 is installed on the supporting frame 22. A spring 44 is set between the brake 40 and a brake line 42 for buffering the braking action so as to avoid this invention sliding to one side. By means of a ball bearing 46, a bushing 48, a ring 50, a protruded portion 52 on a top end of the wheel supporting rod 12A, a corresponding recessed portion 54 on a bottom end of the connecting rod 26, a screw rod 60, a first screw hole 58 and a second screw hole 56, the frame rods 18, 20 are pivoted on the wheel supporting rod 12A. Two handles 10 horizontally is extended from and secured on a top end of a handle supporting rod 12 for controlling the moving direction of the present invention. A brake rod 96 is installed on the right handle 10 for controlling the brake 40. A fixing ring 98 is disposed on the handle supporting rod 12. A brake line 42 extends through a brake line hole 102 of the fixing ring 98. Therefore, the brake line 42 will not mess up nor bother the user.

A lower inserting portion 104 of the handle supporting rod 12 is mated with an upper receiving portion 106 of the connecting rod 26 via a pin 108 passing through holes 110, 112. Then, the handle supporting rod 12 can be fixed with said connecting rod 26. Before the handle supporting rod 12 is connected with the connecting rod 26, a hollow socket 24 is slid on the handle supporting rod 12. While sliding the hollow socket 24 to the connection portion between the handle supporting rod 12 and the connecting rod 26, the handle supporting rod 12 and the connecting rod 26 will be fixed. Thus, the user can manually control the handles to make this invention moving in a desired direction. In order to reduce the frictional resistance, two rubber rings 114 are disposed on two opposite ends of a hollow socket 24.

The above-mentioned statement is a detailed description about all elements in the preferred embodiment. Its assembling method is described as follows:

Please refer to FIGS. 2 and 3. By means of a ball bearing 46, a bushing 48, a ring 50, a protruded portion 52 on a top end of the wheel supporting rod 12A, a corresponding recessed portion 54 on a bottom end of the connecting rod 26, a screw rod 60, a first screw hole 58 and a second screw hole 56, the frame rods 18, 20 of these two pedal plates 14,16 can be pivoted on said wheel supporting rod 12A. Please note that one frame rod 18 has a curved recess 34 on its upper surface and the other frame rod 20 has a screw 38 engaging with said curved recess 34. After which, the user can put a fixing ring 98 to lock on the handle supporting rod 12 via a fixing screw 10. Next, two rubber rings 114 are disposed on two opposite end of a hollow socket 24 as an assembled hollow socket. The assembled hollow socket is fitted on the handle supporting rod 12. By means of a lower inserting portion 104 of the handle supporting rod 12 mating with a upper receiving portion 106 of the connecting rod 26 plus a pin 108, the handle supporting rod 12 can be fixed with said connecting rod 26. So, the major structure is substantially completed. After which, the user can install both the brake rod 96 and the brake 40 on the right handle 10 and the supporting frame 22. The brake line 42 Extends through a brake line hole 102 of the fixing ring 98. One end of the brake line 42 is connected to the brake rod 96. The other end of the brake line 42 is connected to the brake 40.

Regarding to the operation mode, it can be understood by the following description.

Before using this invention, the user needs to pull up the positioning latch 62, so two protruded locking plates 80 of the positioning latch 62 are secured in two transverse slots 76 of the securing cap 64. Therefore, the end of the position latch 62 will be separated from the auxiliary hole 82 of the auxiliary frame 28 so that it allows the auxiliary frame 28 to be swingable. The rubber block 84 can control and buffer the swinging angle of the auxiliary frame 28. The free end of the link 88 is locked on a second locking flange 90 by a bolt 94. Then, by sliding the hollow socket 24, the hollow socket 24 will be set between the handle supporting rod 12 and the connecting rod 26 so as to make the handle supporting rod 12 and the connecting rod 26 be fixed. Thus, the user can control the rolling direction of the front wheel 30. The user's two feet can step on these two pedal plates 14, 16 respectively. If the user forces these two pedal plates 14, 16 swinging to form repeated open and close swinging movements, this invention will move forward. In order to avoid the collision between these two pedal plates 14, 16, the inner sides of the pedal plates are disposed with two rubber pads 116. Furthermore, one frame rod 18 has a curved recess 34. The other frame rod 20 has a screw 38 engaging with said curved recess 34 for limiting a predetermined swinging angle between these two pedal plates 14, 16. Thus, the user can easily control the open or close movements of these two pedal plates 14, 16 and further can improve the safety during skating. Particularly, it is more technical and more challenging for a professional skater or user.

In addition, it is possible to operate this invention in a single pedal plate mode. If the positioning latch 62 is released, these two protruded locking plates 80 pass through a central slot 78 of the securing cap 64. Also, the positioning rod 62 passes through an auxiliary hole 82 of the auxiliary frame 28, so as to make the auxiliary frame 28 be fixed. Next, after rotating the link 86 that is pivoted on a first locking flange 86, the link 86 can be locked on an opposite third locking flange 92. Therefore, these two pedal plates 14, 16 are tightly fixed together as a single pedal plate mode.

When the user wants to fold up this invention for storage, it can be done according to the following steps. First, slide the hollow socket 24 out of the pivotal connecting point between the handle supporting rod 12 and the connecting rod 26. Second, rotate the handle supporting rod 12 down. Third, use a storage train 118 to hook into a storage hole 120 of the link 88.

Based on the above description, the advantages and functions of the present invention can be summarized as follows:

1. The open and close swinging movements of the pedal plates are totally controlled by the user. There is no conventional spring's problem that the spring will compulsively draw these pedal plates back. So, during the skating or sliding, this invention's swinging movements can be totally controlled by the user's mind. Thus, it is more technical and more challenging for a professional skater or user.

2. Because one of the two frame rods having a curved recess and the other one of the two frame rods having a screw engaging with said curved recess, it will limit a predetermined swinging angle between these two pedal plates. During the skating, the stability is good. Plus, the safety is improved.

What is claimed is:

1. A swingable skating board comprising:
a plurality of handles horizontally extending from and secured on a top end of a handle supporting rod, a bottom end of said handle supporting rod being secured by a connecting rod, a supporting rod and a supporting frame, a front wheel being pivotally connected at an inserting end of the supporting rod, two frame rods of two pedal plates being pivotally disposed on said supporting rod, two auxiliary frames being pivotally disposed on two rear ends of said two pedal plates, each auxiliary frame having a slotted end for inserting a ear wheel, wherein:

one of the two frame rods having a curved recess, the other one of the two frame rods having a screw engaging with said curved recess for limiting a predetermined swinging angle between these two plates, wherein a protruded seat having a through hole being disposed on a rear end of each pedal plate, a securing cap being fixed with said protruded seat, a positioning latch passing through said securing cap, a rear spring and a rear washer and being locked by a C-shaped hook; so that when the positioning latch is pulled up, two protruded locking plates on the positioning latch are secured in two transverse slots of the securing cap, so as to allow the auxiliary frame to be swingable; and, when the positioning latch is released, said two protruded locking plates passes through a central slot of the securing cap to make the positioning rod pass through an auxiliary hole of the auxiliary frame, so as to make the auxiliary frame be fixed together.

2. A swingable skating board comprising:

a plurality of handles horizontally extending from and secured on a top end of a handle supporting rod;

a bottom end of said handle supporting rod being secured by a connecting rod, a wheel supporting rod and a supporting frame;

a front wheel being pivotally connected at an inserting end of the wheel supporting rod;

two frame rods of two pedal plates being pivotally disposed on said handle supporting rod;

two auxiliary frames being pivotally disposed on two rear ends of said two pedal plates, each of the auxiliary frames having a slotted end for inserting a rear wheel therein;

one of the two frame rods having a curved recess, the other one of the two frame rods having a screw engaging with said curved recess and adapted to limit a predetermined swinging angle between these two plates;

two rubber rings being disposed on two opposite ends of a hollow socket as an assembled hollow socket, the assembled hollow socket being fitted on said handle supporting rod; and a lower inserting portion of the handle supporting rod mating with a upper receiving portion of the connecting rod via a pin, said handle supporting rod being fixed with said connecting rod, the hollow socket being set between the handle supporting rod and the connecting rod so as to make the handle supporting rod and the connecting rod be positioned at an optimal position.

3. A swingable skating board comprising:

a plurality of handles horizontally extending from and secured on a top end of a handle supporting rod;

a bottom end of said handle supporting rod being secured by a connecting rod, a wheel supporting rod and a supporting frame;

a front wheel being pivotally connected at an inserting end of the wheel supporting rod;

two frame rods of two pedal plates being pivotally disposed on said handle supporting rod;

two auxiliary frames being pivotally disposed on two rear ends of said two pedal plates, each of the auxiliary frames having a slotted end for inserting a rear wheel therein;

one of the two frame rods having a curved recess, the other one of the two frame rods having a screw engaging with said curved recess and adapted to limit a predetermined swinging angle between these two plates;

a ball bearing, a bushing, a ring, a protruded portion on a top end of the wheel supporting rod, a corresponding recessed portion on a bottom end of the connecting rod, a screw rod, a first screw hole and a second screw hole, the frame rods being pivoted on said wheel supporting rod;

two rubber rings being disposed on two opposite ends of a hollow socket as an assembled hollow socket, the assembled hollow socket being fitted on said handle supporting rod; and a lower inserting portion of the handle supporting rod mating with a upper receiving portion of the connecting rod via a pin, said handle supporting rod being fixed with said connecting rod, the hollow socket being set between the handle supporting rod and the connecting rod so as to make the handle supporting rod and the connecting rod be positioned at an optimal position.

* * * * *